Dec. 5, 1961  A. D. SYLVESTER ET AL  3,011,383
DECORATIVE OPTICAL MATERIAL
Filed April 30, 1957  3 Sheets-Sheet 1
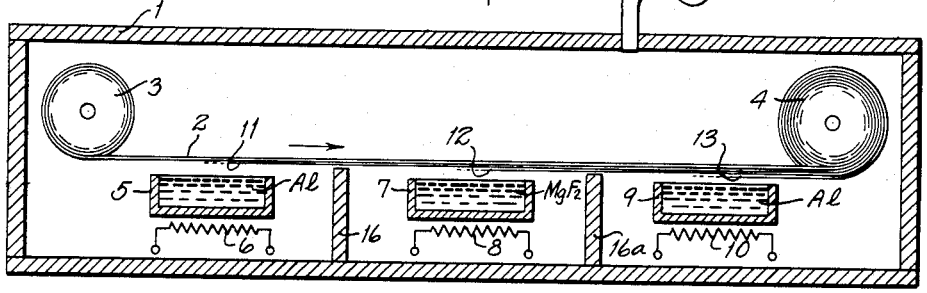
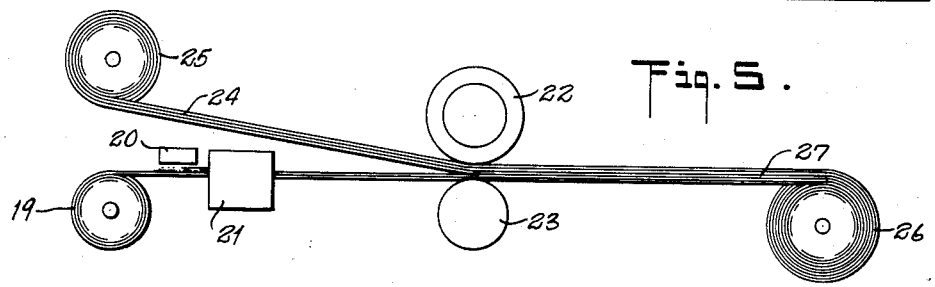
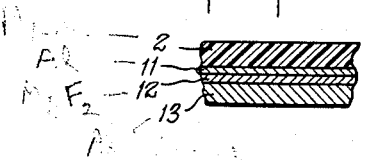
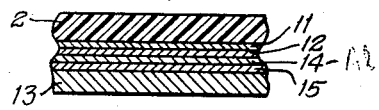
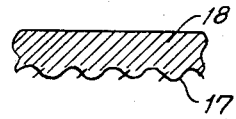
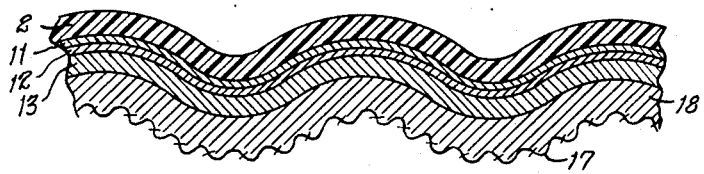
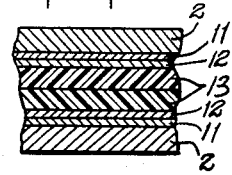
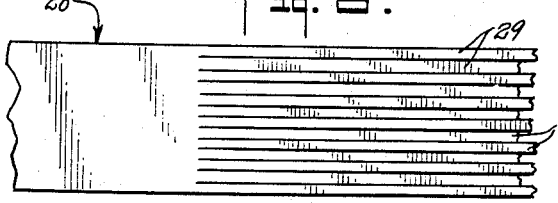
ARTHUR D. SYLVESTER
ARTHUR F. TURNER
HAROLD H. SCHROEDER
INVENTORS
BY Robert A. Dunham
ATTORNEY Dec. 5, 1961　　A. D. SYLVESTER ET AL　　3,011,383
DECORATIVE OPTICAL MATERIAL Filed April 30, 1957　　　　　　　　　　　　　　3 Sheets-Sheet 2

ARTHUR D. SYLVESTER
ARTHUR F. TURNER
HAROLD H. SCHROEDER
INVENTORS

BY Robert A. Dunham

ATTORNEY

Dec. 5, 1961 A. D. SYLVESTER ET AL 3,011,383
DECORATIVE OPTICAL MATERIAL
Filed April 30, 1957 3 Sheets-Sheet 3
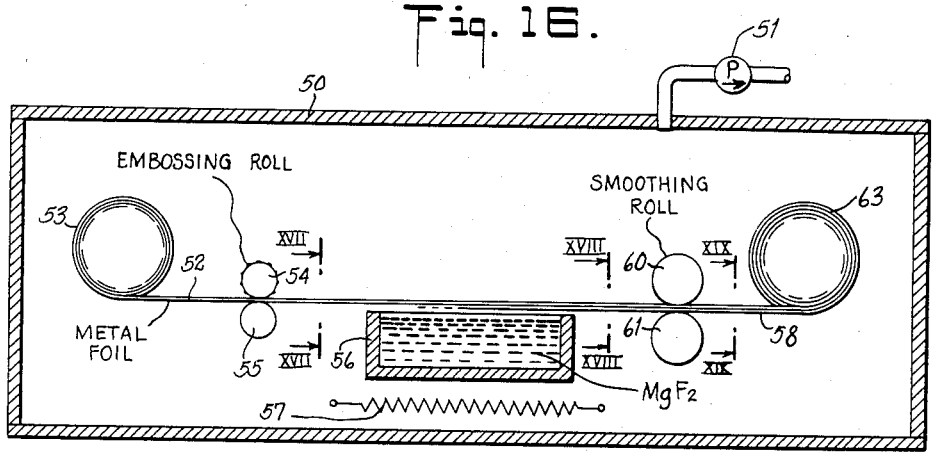
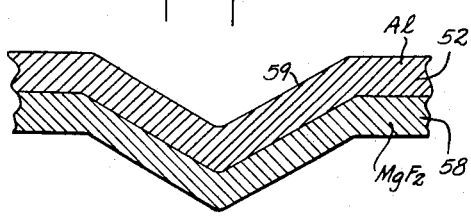
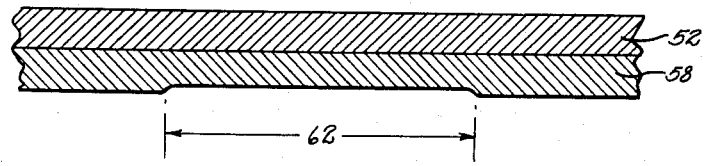
ARTHUR D. SYLVESTER
ARTHUR F. TURNER
HAROLD H. SCHROEDER
INVENTORS
BY Robert A. Dunham
ATTORNEY

United States Patent Office 3,011,383
Patented Dec. 5, 1961

3,011,383
DECORATIVE OPTICAL MATERIAL
Arthur D. Sylvester, Rowayton, Conn., and Arthur F. Turner and Harold H. Schroeder, Rochester, N.Y., assignors to L. E. Carpenter & Company, Wharton, N.J., a corporation of New Jersey
Filed Apr. 30, 1957, Ser. No. 655,996
5 Claims. (Cl. 88—1)

This invention relates to materials having characteristics with respect to the reflection of radiant energy, e.g., light, which are selective with respect to the frequency of that radiant energy. Such materials are peculiarly useful as surface covering materials, but are not restricted to such use. The invention also relates to methods of producing such materials. The invention relates particularly to decorative or ornamental sheet materials having an iridescent appearance. In its broader aspects, however, the invention includes materials in other than sheet form and may involve materials having important reflective characteristics with respect to radiant energy having a wave length outside the visible spectrum.

Color or frequency selective reflection characteristics are attained, in accordance with the present invention, by providing a laminated covering material, and selecting the substances and thicknesses of the several laminations to provide an interference effect which determines the particular selective reflection characteristics.

In the presently preferred embodiment of the invention described herein, the laminated covering material is applied to a flexible plastic coated fabric material of a well-known type, which may comprise a coating of a vinyl resin dispersion placed on a fabric backing and subsequently cured. The laminated surface covering material of the present invention is also applicable to vinyl sheet materials which are unsupported (i.e., have no fabric backing) and to supported or unsupported surfaces of other plastic materials. Furthermore, it may be applied to any rigid or semi-rigid support of any suitable material, providing a suitable bonding agent is used between the laminated covering material and the underlying support.

The selectivity may be provided either as an emphasis of a selected frequency or frequencies, or as an absorption or filtering of a selected frequency or frequencies or as emphasis of one or more frequencies and absorption of others.

The selectivity may be provided within the range of the visible spectrum, and indeed is so provided in most of the specific examples of the invention described below. Where the selectivity is within the visible spectrum, materials manufactured in accordance with the invention are particularly suitable for decorative purposes. Where the selectivity is outside the visible spectrum, materials so manufactured may be suitable for other purposes as mentioned below.

Several arrangements have been proposed in the prior art for utilizing interference effects to produce reflection characteristics varying with frequency. Such arrangements have been proposed only for optical purposes, and have utilized only rigid, smooth supporting structures or substrates. As an example of such an arrangement, see the paper entitled "Reflection Filters for the Visible and Ultra-Violet" by A. F. Turner and H. R. Hopkinson, presented at the Rochester, N.Y., meeting of the Optical Society of America, October 15-17, 1953, Paper #55. The simplest filter described in that paper consists of a rigid substrate of glass or metal on which is formed the following sequence of films: an opaque aluminum base film, a half-wave spacer of dielectric material, and a semi-transparent metallic film. More complex filters are suggested comprising a plurality of pairs of layers superimposed on the opaque base film, each pair consisting of one dielectric spacer film and one semi-transparent metal film.

In the prior art arrangements of the type mentioned above, the supporting structures proposed have been rigid, to provide the necessary strength to maintain the integrity of the thin films, which are structurally weak, since their thickness must be of the order of the light wave lengths involved. Those prior art arrangements have necessarily been formed on a smooth base or substrate. Indeed, they have always used a plane base, since the frequency or frequencies selected for absorption or reflection vary with the angle of incidence of the light, and any curvature or irregularity of the surface would introduce an irregular reflection. The filters so constructed have always been relatively small in lateral extent. Furthermore, in order to maintain constant frequency selective characteristics, it has been necessary to maintain the thickness of the layers accurate within very narrow limits.

The application of these known optical principles to a surface covering material of relatively large area for decorative or ornamental purposes presents new problems, in addition to many of the problems present in the construction of optical filters. The problem of supporting the layers to maintain their structural integrity is intensified, because of the greater areas involved. This problem of support is further complicated by the fact that, for many purposes, it is desirable that the entire multiple layer material be flexible, so that it may be readily applied to objects of various contours. A further and somewhat related problem is that in many instances, the outer layers may, in use, come into mechanical contact with various objects. Consequently, a protective structure must be provided to prevent damage to the thin, relatively weak, reflecting layers. This protective structure must have suitable mechanical characteristics, and also must not adversely affect the optical characteristics of the thin layers.

Another prior art arrangement suggests building up on a suitable support a laminated structure comprising first a reflecting layer such as metal foil, second a birefringent plastic layer, third a layer of light polarizing material, and finally a covering layer of material adapted to be embossed. The covering layer varies in thickness thereby producing lens-like effects. The color selection and variation due to interference effects is determined by the polarizing characteristics of the materials and also by the contour of the lens-like structures embossed or otherwise formed in the surface. The thicknesses of the various layers in this material are apparently not critical. It has been suggested to apply this material to flexible sheets as well as to rigid supports, presumably by making each layer thick enough and thereby strong enough to maintain its structural integrity when the composite material bends or flexes. Such flexible sheets are necessarily stiffened by the superposition thereon of a plurality of relatively thick layers. Furthermore, the quantities of optical materials required are relatively large as compared to the thin layers involved where the interference effects are obtained without the use of light polarizing and birefringent substances.

An object of the invention is to provide an improved radiant energy reflecting material.

A further object is to provide a sheet material of the type described which may be applied as a surface covering to a wide variety of support structures including flexible sheet material.

A further object is to provide a sheet material of the type described which may be contoured, e.g., by embossing.

Another object of the invention is to provide improved processes for making material of the type described.

The foregoing and other objects are attained in the products and processes described below. In the presently preferred process, the improved material is constructed by building up a laminated structure on a base of transparent plastic material, for example, the plastic material sold under the trade-mark Mylar (polymerized ethylene glycol terephthalate). The first lamination placed on the base material is a semitransparent layer of metal, for example, aluminum. The second lamination is a layer of dielectric material, preferably of low refractive index, such as magnesium fluoride. Additional pairs of laminations, alternately, semi-transparent metal and transparent dielectric, may be employed. The last lamination, however, is a thicker, preferably opaque metallic layer, again preferably aluminum. This laminated material is the covering material referred to above.

This covering material may then be bonded to a suitable supporting body, with the opaque metallic layer nearest the body. The supporting body may be, for example, a sheet of plastic coated material. During or after the bonding process, the surface of the covered body may be contoured, as by embossing. The transparent plastic layer, now on the outside of the covered body, protects the thin underlying laminations and maintains their structural integrity during the contouring or embossing process, if any, and also during subsequent use of the material.

The light modifying action of the laminated covering material controls the color, i.e., both hue and chromaticity of the composite body. This light modifying action may be modified by controlling the thickness and number of layers used and by selection of materials. The light modifying action is additionally affected by the surface contouring of the composite body, e.g., by embossing or other suitable processes.

Other objects and advantages of the invention will become apparent from a consideration of the following description and claims, taken together with the accompanying drawings.

In the drawings:

FIG. 1 is a somewhat diagrammatic illustration of apparatus for forming laminations on a plastic sheet backing, in accordance with the process of the invention;

FIG. 2 is a cross-sectional view on an enlarged scale of the product of the process of FIG. 1;

FIG. 3 is a cross-sectional view, similar to FIG. 2, illustrating a modified form of product constructed in accordance with the invention;

FIG. 4 is a cross-sectional view on an enlarged scale of a vinyl plastic coated sheet of conventional form;

FIG. 5 is a somewhat diagrammatic illustration of the process of combining the laminated sheet product of the process of FIG. 1 with the vinyl plastic coated fabric of FIG. 4;

FIG. 6 is an enlarged cross-sectional view of the product of the process of FIG. 5, showing the sheet of FIG. 2 superimposed on the sheet of FIG. 4 and the composite sheet embossed;

FIG. 7 is a cross-sectional view of a modified form of decorative sheet material constructed in accordance with the invention;

FIG. 8 is a plan view of the modification of FIG. 7;

FIG. 16 is a somewhat diagrammatic view generally similar to FIGS. 9 and 10, illustrating a still further embodiment of the invention;

FIG. 17 is a cross-sectional view taken along the line XVII—XVII of FIG. 16, showing the material undergoing treatment;

FIG. 18 is a view taken along the line XVIII—XVIII of FIG. 16 illustrating the material at a late stage in its treatment; and FIG. 19 is a view taken along the line XIX—XIX of FIG. 16, showing the product as it is finished in the apparatus of that figure.

FIGS. 1, 2 AND 3

Figure 9:
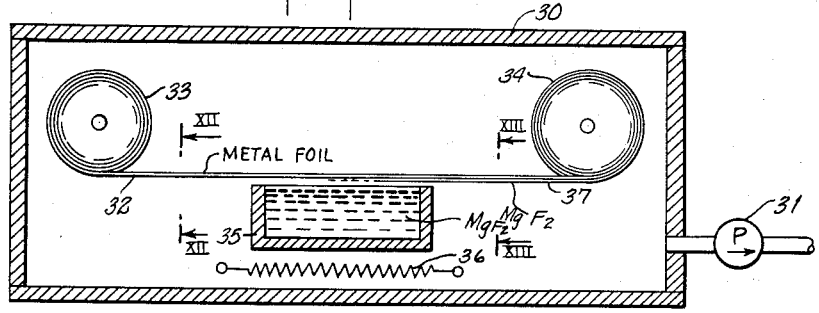
FIG. 9 is a somewhat diagrammatic illustration of a first step in a modified process for producing decorative sheet material in accordance with the invention.

Referring now to FIG. 1, there is shown somewhat diagrammatically, one type of apparatus which may be used in carrying out the invention. This apparatus includes a housing 1 which must be evacuated, for example, by means of a pump 1a. The process described takes place under extremely low pressures, for example, between $5 \times 10^{-5}$ to $5 \times 10^{-4}$ millimeters of mercury. These pressure limits are not critical, but any pressure within the range indicated is suitable. An outer base layer 2 of transparent thin flexible plastic material passes from a supply reel 3 to a take-up reel 4. A polyester plastic commonly sold as Mylar (polymerized ethylene glycol terephthalate) is presently preferred for the base layer or sheet 2, but other materials in the form of flexible plastic sheets may be used, providing they have sufficient strength, including unplasticized vinyl resins, Saran (polyvinylidene chloride), acryloid and acetate resins, for example, cellulose acetate butyrate. Plasticized resins may be used providing the plasticizer is one which is not detrimentally drawn out of the material by the high vacuum.

The thickness of the plastic sheet may vary somewhat. A Mylar sheet 0.0005 in. thick gives good results. Where the sheet is to be subsequently embossed, the maximum practical thickness for Mylar is about 0.002 in. Thinner sheets may also be used.

After the base layer or sheet 2 leaves the supply reel 3, it passes a crucible 5 filled with a suitable metal, for example, aluminum, which is heated to vaporization temperature by any suitable means, for example, by the passage of electric current through a heating coil 6. The sheet 2 passes sufficiently close to the crucible 5 so that the aluminum vapor condenses on the surface of the sheet, forming a coating 11. The speed of movement of the sheet 2 is coordinated with the density of the vapor and the dimensions and temperature of the crucible to establish the coating 11 on the sheet at the proper thickness. The thickness desired is one which will make the coating 11 semi-transparent. For example, in the case of aluminum, a coating thickness of about 75 Angstrom units is suitable. This thickness is not critical. This thickness will give an equivalent transmission of light of about 30%. Some light transmission will be obtained up to a thickness of about 250 Angstrom units.

After passing the crucible 5, the sheet 2 passes over a crucible 7 containing a suitable dielectric material, for example, magnesium fluoride, which is heated to vaporization temperature by a suitable heating unit such as a heating coil 8. The vapor of this dielectric material condenses on the sheet 2 over the semi-transparent metal coating, forming another coating or layer 12. The thickness of this dielectric coating 12 is also controlled by the speed of the sheet and the dimensions of the tank 7 and its temperature to secure a desirable thickness. The permissible thickness variations of the dielectric film 12 are discussed in detail below.

After passing the crucible 7, the sheet 2 passes over a third crucible 9, also containing aluminum, which is maintained at a vaporizing temperature by a heating coil 10. The vapor produced in the crucible 9 also condenses on the sheet 1, covering the dielectric layer with another layer 13. The layer produced at the crucible 9 is in many instances made thick enough so as to be opaque, i.e., over about 250 Angstrom units. The upper limit of thickness of this layer 13 is then not critical, except as may be required by the desired flexibility of the resulting material, for particular purposes.

In some instances, it may be desirable to make the layer 13 thinner, i.e., to have a thickness in the range of partial transparency, below 250 Angstrom units; although ordinarily, in accordance with this invention, the layer 13 is opaque and is generally referred to hereinafter as an opaque layer.

Between the crucibles 5 and 7, the sheet 2 passes closely over a transverse septum 16, the function of which is to minimize contact between the vapor from crucible 5 and the vapor from crucible 7. A similar septum 16a is located between the crucibles 7 and 9.

The thickness of any of the coatings may be controlled by providing suitable apparatus for observing photoelectrically the light transmission or reflection properties of the material leaving any one of the crucibles and regulating one of the variables of that crucible, e.g., sheet speed or crucible temperature, in response to that observation to maintain the observed properties constant. In the case of crucible 9 and layer 13, where this layer is in the semi-transparent range, variation of the thickness of this layer may be utilized to correct errors introduced in the previous coating steps, in order to obtain a desired color effect. For that purpose, the light transmission or reflection property may be observed before the film passes over the crucible 9, and the film thickness produced by crucible 9 may be controlled in accordance with the need therefor indicated by the observation.

In many cases, it is desirable to carry on the three successive coating steps described above in three separate housings, rather than in a single housing. In such an arrangement, the material is unreeled and reeled again in connection with each coating step. The use of three separate housings, however, provides opportunity for better independent control of the coating thickness in each of the three steps. For example, the speed of movement of the material may readily be made different in each step, whereas, if the three steps are carried out in one housing, the speed must either be the same for all, or the apparatus must be greatly complicated.

The product of this process is illustrated in FIG. 2, and includes the base sheet 2 of transparent plastic material, a semi-transparent metallic layer 11, a dielectric layer 12 and an opaque metallic layer 13.

The material used for the metallic layers may be any metal which is sufficiently reflective. The metal need not be the same in the two layers. Aluminum is presently preferred because it is easy to vaporize, has a high reflectance and is relatively inexpensive. There is some evidence that Inconel (a corrosive resisting alloy of nickel, chromium and iron), chromium, or titanium may be preferable for the semi-transparent layers. The metal must be one which vaporizes readily if the coating process is one of vaporization and condensation, as described herein. Gold and silver may be used in place of aluminum for the opaque layer.

The dielectric layer, which has been indicated by way of example as being magnesium fluoride, may be any dielectric material which can be practically and readily evaporated. The preferred materials are those with the lower refractive indices. Magnesium fluoride is presently preferred. Other suitable materials include calcium fluoride, zinc sulfide, silicon monoxide, titanium dioxide, and cryolite ($Na_3AlF_6$).

Light striking the material from above, as viewed in FIG. 2, passes through the plastic material sheet 2 which is always transparent and is partially reflected from the semi-transparent metallic layer 11. The light transmitted through the layer 11 passes on through the dielectric layer 12 and is reflected from the opaque layer 13, whence it passes back through the dielectric layer 12 again and outwardly through the semi-transparent layer 11 and thence through the transparent plastic sheet 2. The light directed from the rear surface of sheet 2 (from the point of view of an observer viewing the structure of FIG. 2 from above) comprises two principal components, namely the component reflected from the semi-transparent layer 11 and the light reflected from the opaque layer 13. The second of these components is displaced in phase from the first by an amount dependent upon the thickness of the dielectric layer 12 and its refractive index. If the thickness of the dielectric layer is chosen so that light of a certain wave length reflected from the opaque layer 13 is displaced by one-half wave length from the light reflected from layer 11, then the two reflected components will be out of phase by one-half a wave length and will partially cancel each other. If their amplitudes are equal, they will completely cancel.

On the other hand, if the dielectric layer is selected so that the component reflected from layer 13 is displaced one full wave length from light of the same frequency reflected from layer 11, then the two reflected components will coincide in phase, and light of that particular frequency will be emphasized as it appears to an observer.

The thickness of the dielectric layer 12 and dielectric material may be selected either with a view to filtering out one particular light frequency (destructive interference) or with a view to emphasizing one particular frequency (constructive interference). For other frequencies having different wave lengths, the filtering or enhancement effect of the selected thickness and material of the dielectric layer will vary with the wave length.

To enhance the reflection of light of a particular frequency, the thickness of the dielectric layer 12 should be an even multiple of quarter-wave lengths of that frequency in the particular material of which the layer 12 is made.

To filter or reduce the reflection of light of that particular frequency, the thickness of the dielectric layer 12 should be an odd multiple of the same quarter-wave lengths.

It is obvious that the operative range of thicknesses for the dielectric layers is wide, since the range of frequencies which may be selectively enhanced or reflected extends throughout the light spectrum, i.e., from the shortest ultra-violet to the longest infra-red. Since multiples of quarter-wave lengths are involved, the range of thicknesses for a particular material is from one quarter-wave length of the shortest ultra-violet to a maximum of about nine or ten wave lengths in the longest infra-red.

Where the material is to be used for decorative purposes, the color effect will be iridescent. It is therefore not necessary to hold the thickness of the dielectric layer, or indeed any of the layers constant, but rather wide tolerances are permissible. Variations in thickness incidental to these wide tolerances introduce still further iridescent effects, which may further enhance the beauty and ornamental value of the product.

In accordance with a modification of the invention, as shown in FIG. 3, additional layers or coatings of semi-transparent metallic and dielectric materials may be employed. The final layer is usually made opaque. The intervening layers are applied in pairs, one semi-transparent metallic layer and one transparent dielectric layer comprising a pair. The materials used in the different metallic layers need not be the same, nor need the materials used in the different dielectric layers be the same. The thicknesses of the dielectric layers may vary. The transparency, i.e., the light transmission characteristics, of the semi-transparent layers, where more than one is used, should be greater nearer the plastic base layer 2. For example, in the structure illustrated in FIG. 3, there is provided a base layer 2 on which is formed a semi-transparent layer 11 and a dielectric layer 12 which may be the same as the corresponding layers in FIG. 2. On those layers there is superimposed a second pair of layers including a semi-transparent layer 14 and a dielectric layer 15. An opaque layer 13 covers the dielectric layer 15. The semi-transparent layer 14 should have a lower light transmission than the semi-transparent layer 11. For example, the layer 11 may be 30 Angstrom units thick, as suggested in the case of FIG. 3, in which case the layer 14 may be 60 Angstrom units thick. These thicknesses are suggested by way of example only, to indicate the sequence in which the thicknesses should increase.

An observer looking at one of the laminated sheet materials of FIGS. 2 and 3, from above, when illuminated by light from above, will see an iridescent effect due to the different angles of incidence and reflection of the light from different parts of the sheet. The distance travelled by the reflected light in the dielectric layer 12 varies with the angles of incidence and of reflection of the light, so that the wave cancellation and wave enhancement which occur with different light frequencies also vary with the angles of incidence and reflection, producing the iridescent effect described.

The laminated sheet materials as shown in FIGS. 2 and 3 are adapted for use as covering materials and may be so used on almost any type of supporting body, the opaque layer 13 being placed next to the body and bonded thereto by any suitable bonding material or process. The laminated material, and particularly the base sheet 2, may be either flexible or rigid, depending upon the ultimate use which is to be made of it, i.e., the particular body on which it is to be mounted.

The layers 13, 12 and 11 are structurally weak, and must be placed against a support or a covering layer of some kind, to protect them and preserve their structural integrity.

FIGS. 4, 5 AND 6

A particularly useful and desirable modification of the invention may be produced in the apparatus illustrated in FIG. 5. According to this modification of the invention, the laminated material of FIG. 2, is applied as a covering sheet to a known type of material consisting of a fabric backing with a vinyl plastic coating and illustrated in FIG. 4.

As shown in FIG. 4, the sheet material commonly has a fabric backing 17, usually cotton duck, and is provided with a vinyl plastic coating 18. In the process as illustrated in FIG. 5, cotton duck is supplied from a supply reel 19 and passes through suitable coating apparatus generally indicated at 20, where a coat of a vinyl dispersion in a somewhat liquid form is deposited on the sheet. The sheet then passes through a furnace schematically indicated at 21 where the volatile components of the dispersion, if any, are evaporated and the dispersion is brought into a fused condition where the plastic and plasticizing components from a mutual solution. In this condition, the sheet passes between an embossing roll 22 and an opposed backing roll 23. As it passes between these two rolls, it is joined by a composite sheet 24 coming from a supply reel 25 and having a structure such as that illustrated in FIG. 2. The plastic sheet corresponding to that shown at 2, FIG. 2 is on the upper side of the composite sheet 24 and the opaque metallic layer 13 on the lower side is forced by the rolls 22 and 23 into engagement with the vinyl resin. One of the rolls 22 and 23 is preferably cooled so that the sheet material passing between the rolls has its thermoplastic components set at that point. The laminated covering sheet is thereby tightly bonded to the vinyl plastic coating and the complete material is embossed with a predetermined pattern established by the contour of the embossing roll. The finished product 27 then passes to a take-up reel 26. The structure of the finished product is shown in FIG. 6, and includes six layers, the underlying cotton duck sheet material 17, the vinyl plastic coating 18, the opaque metallic layer 13, the dielectric layer 12, the semitransparent metallic layer 11 and the covering layer 2 of plastic material.

When the material is embossed with more or less lenticular indentations, a further effect of iridescence is produced in addition to the iridescent effect resulting from the different angles of incident reflection due to the relative positions of the light source and the eye of the observer. This additional iridescent effect is due to the difference in the angles of incidence and reflection because of the contour differences introduced by the embossing. By making the embossed pattern in more or less parallel lenticular ridges and grooves, having different directions in different areas, a gross pattern may be produced on the surface of the material. For example, the gross pattern might be a checkerboard pattern with alternate squares appearing to an observer in one iridescent color and the other squares in a different iridescent color. If desired, the embossed lines could have contours corresponding to those of a Fresnel lens, so as to produce an illusion as to the contour of the surface, as disclosed in the copending applications of Arthur D. Sylvester and Arno H. Scheiding, Serial No. 578,762, filed April 17, 1956, and Serial No. 589,741, filed June 6, 1956 now U.S. Patent 2,958,148.

Application Serial No. 578,762 has now been abandoned in favor of a continuation-in-part application, Serial No. 682,566, filed September 4, 1956, now Pat. No. 2,875,543.

FIGS. 7 AND 8

These figures illustrate a modified product constructed in accordance with the invention. As shown in FIG. 7, this product consists of two sheets of the type shown in FIG. 2 bonded together with their opaque aluminum layers 13 adjacent to and contiguous with each other. Each of the two laminated sheets acts as a cover or support for the other. The material of FIG. 7, when in sheet form as shown at 28 in FIG. 8, is suitable for a wrapping material. Alternatively, it may be slit into strips or filaments as shown at 29 in FIG. 8. These strips or filaments may then be employed in known processes for producing decorative materials, such as weaving, knitting or simply bonding the filaments to other surfaces.

Although the invention has been described as adapted to a continuous process utilizing an elongated sheet of material, it is equally well adapted to the use of a process which acts sheet by sheet on pieces of limited area. If the sheet by sheet process is used, then the base layer of plastic material may be rigid rather than flexible as required where the material needs to be rolled for handling or storage as in the processes of FIGS. 1 and 5. The underlying plastic sheet or other supporting material may also be rigid, if it is not embossed. If the sheets are to be embossed or otherwise contoured, the base sheet 2 and the underlying plastic layer 18 must be deformable at least at the moment of embossing.

The process and product described above are particularly suitable for the selective reflection of light waves in the visible spectrum in accordance with their particular frequencies. However, the same principles may also be used for the selective reflection of wave lengths outside the visible spectrum, including both the ultra-violet and infra-red range. The infrared reflecting material may be highly desirable, for example, to reflect heat waves when used as a wall covering material in a room heated by radiant heat. The ultra-violet reflecting material may find particular utility where it is desired to protect the underlying plastic layers from deterioration by ultra-violet rays, for example, in sunlight.

FIGS. 9 TO 15

These figures illustrate a modified process for forming a laminated decorative material in accordance with the invention. In this modified process, the base material is a layer of metal foil which serves as the underlying opaque layer in the finished product. The thin interference layers are built up on this metal foil by the vaporization and condensation of the materials, in a manner generally similar to the process of FIG. 1. The final protective coating may be placed over the outermost of the interference layers by any suitable commercial process, such as spray coating, brush coating, or the like.

Figure 12:
FIG. 12 is a cross-sectional view taken along the line XII—XII of FIG. 9, showing the material undergoing treatment at that point in the process.
Figure 13:
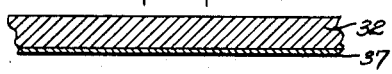
FIG. 13 is a cross-sectional view taken along the line XIII—XIII of FIG. 9, showing the material undergoing treatment at that stage in the process.
Figure 14:
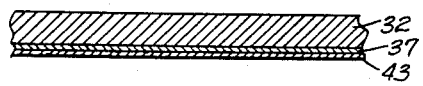
FIG. 14 is a cross-sectional view taken along line XIV—XIV of FIG. 10, showing the material as it leaves the next to last step of the process.

Referring to FIG. 9, there is shown a housing 30 evacuated by means of a pump 31. Within the housing 30, a sheet 32 of metal foil proceeds from a supply reel 33 to a take-up reel 34. The metal foil 32 (FIGS. 9 and 12) may be aluminum or copper, or it may be gold or silver. The sheet 32 passes over a crucible 35 containing molten dielectric material, for example, magnesium fluoride. The crucible 35 is maintained at a temperature to vaporize the dielectric material by a suitable heating mechanism, for example, an electric coil 36. The heat from the coil 36 vaporizes the magnesium fluoride, which condenses on the metal foil 32, forming a coating 37 (FIGS. 9 and 13). The coating thickness may be controlled in the manner described in connection with FIGS. 1 to 8. The same range of thickness applies as in the case of the dielectric layers of that modification.

Figure 10:
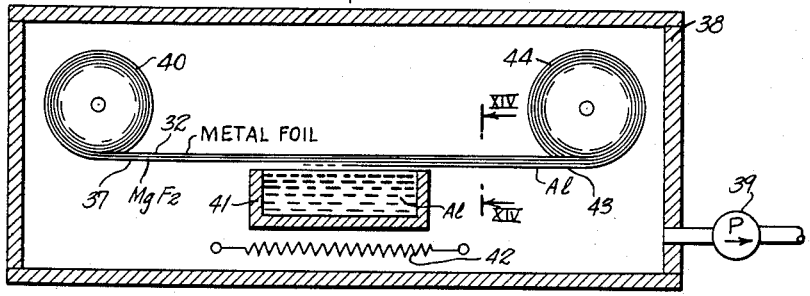
FIG. 10 is a somewhat diagrammatic illustration, similar to FIG. 9, showing a second step in the modified process.

In FIG. 10, the metal foil 32 with its magnesium fluoride layer 37 is treated to give it a further coating of semi-transparent metallic material, which may be aluminum. The process of FIG. 10 takes place in a housing 38, which is evacuated by means of a pump 39. The starting material for the process of FIG. 10 is the finished material from the process of FIG. 9. In FIG. 10, this material moves from a supply reel 40 past a crucible 41 heated by a resistance heater 42. The crucible contains molten aluminum heated to vaporization. As the sheet material passes over the crucible, a layer 43 of aluminum is deposited thereon. The material then passes to a take-up reel 44.

Figure 11:
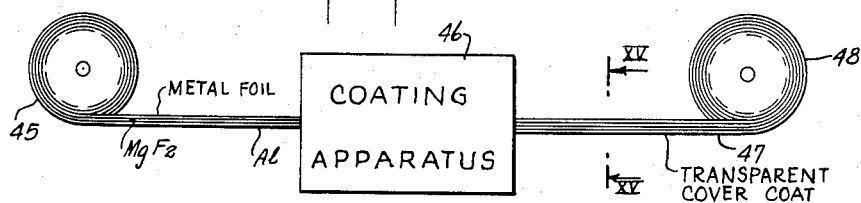
FIG. 11 is a somewhat diagrammatic view similar to FIGS. 9 and 10, showing a third step in the modified process.
Figure 15:
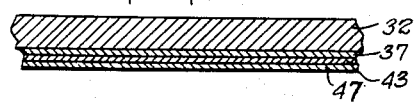
FIG. 15 is a cross-sectional view taken along the line XV—XV of FIG. 11, illustrating the finished product.

The material resulting from the process of FIG. 10 is treated as illustrated in FIG. 11 to give it a further coating of transparent protective material. This material may be either a lacquer or some sort of plastic material which is transparent. In FIG. 11, the material to be coated passes from a supply reel 45 through a coating apparatus schematically illustrated at 46, where it receives a transparent cover coat 47. The finished material is then wound on a take-up reel 48. The finished product of the process of FIGS. 9, 10 and 11 is shown in FIG. 15. It may there be seen that this product is in general not distinguishable from the product shown in FIG. 2 for the process of FIG. 1. The principal difference in the processes is that in the process of FIGS. 9 to 11 the intermediate layers are built up in sequence on the opaque metallic layer as a base, whereas in FIG. 1, the layers are built up on the transparent covering material as a base.

FIGS. 16 TO 19

These figures illustrate a modification of the process of FIGS. 9 to 15 and the product thereof in accordance with one feature of the invention. This modified feature involves the production of an irregular contour in the sheet material, for example, by means of embossing or crumpling, before the material enters the first coating step. This irregular contour results in the deposition of the coating material unevenly on the sheet, depending upon the pattern of the embossing rolls or of the crumpling operation. After the coating has been deposited, the material may then be smoothed in ironing or smoothing rolls so that the finished material is substantially flat, but has a coating applied thereon in accordance with either a desired pattern, as by embossing, or in accordance with a random distribution, such as is produced by a crumpling operation.

Referring to FIG. 16, it may be seen that the process is carried out in a housing 50 evacuated by means of a pump 51. The sheet material, which may be a metal foil 52 proceeds from a supply reel 53 between an embossing roll 54 and an opposed pressure roll 55, which cooperate to emboss a predetermined pattern in the foil. The foil then passes over a crucible 56 containing, for example, magnesium fluoride heated to vaporization by means of a resistance heater 57. As the foil passes over the crucible 56, a coating 58 of the dielectric material is deposited on it. FIG. 17 shows on an enlarged scale the sheet material 52 with an embossed depression 59 formed in it. As this material is coated in passing over the crucible 56, it may be seen that the coating 58 is thinner in the region of the depression 59 than it is in the level parts of the foil sheet 52. The reason for this thinner area is that the vapor tends to condense in a constant quantity per unit area taken on a horizontal plane. Consequently, the surfaces of the depression 59 which are not horizontal receive thinner coatings, i.e., thinner when measured in a direction perpendicular to the surface.

After passing the crucible 56, the foil 32 moves between smoothing rolls 60 and 61 which iron out the depressions formed by the embossing roll 54. There results the material shown in FIG. 19, where the dielectric coating 58 is thinner in a region indicated at 62, this being the region represented by the depression 59 in FIGS. 17 and 18. The material is then wound on a take-up reel 63.

The material is then further treated by applying a semi-transparent metal layer and possibly other layers, as in the process of FIGS. 9-15.

It may be seen that this feature of embossing or otherwise making the surface of the sheet material irregular and later smoothing it may be applied in a great many different ways in the processes of FIGS. 1 to 8 and 9 to 15. The embossing may be done before each coating step and smoothed out again afterwards, introducing a different pattern at each embossing. Alternatively, the sheet may be embossed before the first coating step and never smoothed out at all. Alternatively, it may be embossed before any one of the intermediate coating steps and smoothed after the last one.

The difference in contour introduced by the embossing does not have to be very great in order to produce an observable iridescent pattern in the finished material. A slight difference in the thickness of the coating 58 is sufficient to change the light interference characteristics of the material so as to produce an observable color difference when viewing the finished product.

There may be thus produced a decorative material having several different iridescent patterns, each appearing in a distinctive predominant color, and all observable simultaneously.

While we have shown and described certain preferred embodiments of our invention, other modifications thereof will readily occur to those skilled in the art, and we therefore intend our invention to be limited only by the appended claims.

We claim:

1. A light reflective, laminated, flexible and non-rigid material comprising an outer base layer of transparent plastic material, a non-rigid inner base layer consisting essentially of flexible metallic material thick enough to be substantially opaque and reflecting, and at least one pair of intermediate layers disposed between and contiguous with said base layers and with each other, the outermost layer of each said pair consisting essentially of metallic, reflecting material thick enough to be semi-transparent and the innermost layer of each said pair consisting essentially of transparent dielectric material having a thickness of about one-quarter wave length to about ten wave lengths of radiant energy within the light spectrum to be reflected, the resulting laminated material as a whole having coloring which is dependent upon the constructive and destructive interference between light reflected by the several layers.

2. A light-reflecting, laminated, flexible and non-rigid material, comprising an outer base layer of transparent plastic material, a non-rigid inner base layer consisting essentially of flexible metallic material thick enough to be substantially opaque and reflecting, and at least one pair of intermediate layers disposed between and contiguous with said base layers and with each other, the outermost layer of each said pair consisting essentially of metallic reflecting material thin enough to be semi-transparent and the innermost layer of each said pair consisting essentially of transparent dielectric material having a thickness of about one-quarter wave length to about ten wave lengths of the radiant energy within the light spectrum to be reflected; and a layer of non-rigid and flexible material contiguous with and bonded to the opposite side of said opaque inner base layer; the laminated material as a whole having coloring which is dependent solely upon the constructive and destructive interference between light reflected by the several layers.

3. A light-reflective material in accordance with claim 2, in which said layer of non-rigid and flexible material which is contiguous with and bonded to said opaque inner base layer comprises a textile fabric coated with a plastic material.

4. A light-reflective material in accordance with claim 2, in which said material produced as aforesaid is embossed.

5. A light-reflective material in accordance with claim 2, in which said layer of non-rigid and flexible material which is contiguous with and bonded to said opaque inner base layer is made up to be the same as the laminated layers including said inner and outer base layers and at least one pair of intermediate layers therebetween all as aforesaid; the material so made up affording radiant energy-reflective properties from both its opposite surfaces.

References Cited in the file of this patent

UNITED STATES PATENTS

| | | |
|---|---|---|
| 2,590,906 | Tripp | Apr. 1, 1952 |
| 2,702,580 | Bateman | Feb. 22, 1955 |
| 2,709,663 | McLean et al. | May 31, 1955 |
| 2,714,569 | Prindle et al. | Aug. 2, 1955 |
| 2,740,732 | Peck et al. | Apr. 3, 1956 |
| 2,759,866 | Seymour | Aug. 21, 1956 |
| 2,782,676 | Osterberg | Feb. 26, 1957 |

FOREIGN PATENTS

| | | |
|---|---|---|
| 742,530 | Great Britain | Dec. 30, 1955 |

OTHER REFERENCES

Distillation Products, Inc., publication "Vaporized Metal Coatings by High Vacuum," New York, 1949.